(12) United States Patent
Sanchez

(10) Patent No.: US 8,649,885 B2
(45) Date of Patent: Feb. 11, 2014

(54) FREQUENCY SELECTIVE ITERATIVE LEARNING CONTROL SYSTEM AND METHOD FOR CONTROLLING ERRORS IN STAGE MOVEMENT

(75) Inventor: Rene Sanchez, San Francisco, CA (US)

(73) Assignee: Nikon Corporation, Tokyo (JP)

( * ) Notice: Subject to any disclaimer, the term of this patent is extended or adjusted under 35 U.S.C. 154(b) by 349 days.

(21) Appl. No.: 12/323,117

(22) Filed: Nov. 25, 2008

(65) Prior Publication Data

US 2010/0128238 A1  May 27, 2010

(51) Int. Cl.
- G05B 13/02 (2006.01)
- G05B 19/18 (2006.01)
- G03B 27/58 (2006.01)
- G03B 27/32 (2006.01)

(52) U.S. Cl.
USPC .................... 700/44; 700/60; 355/77; 355/72

(58) Field of Classification Search
USPC ........................................................... 355/62
See application file for complete search history.

(56) References Cited

U.S. PATENT DOCUMENTS

| | | |
|---|---|---|
| 5,416,397 A | 5/1995 | Mazzara et al. |
| 5,511,930 A | 4/1996 | Sato et al. |
| 5,623,853 A | 4/1997 | Novak et al. |
| 5,757,149 A | 5/1998 | Sato et al. |
| 5,793,052 A | 8/1998 | Kawaguchi |
| 6,504,162 B1 | 1/2003 | Binnard et al. |
| 6,725,101 B2 | 4/2004 | Sanchez et al. |
| 7,181,296 B2 | 2/2007 | Rotariu et al. |
| 2004/0128918 A1 | 7/2004 | Yang et al. |
| 2005/0231706 A1 | 10/2005 | Yang et al. |
| 2006/0170382 A1 | 8/2006 | Yang et al. |
| 2007/0268475 A1 | 11/2007 | Binnard |
| 2008/0067968 A1 | 3/2008 | Binnard et al. |

FOREIGN PATENT DOCUMENTS

WO   WO2005036620 A1   4/2005

*Primary Examiner* — Peter B Kim
*Assistant Examiner* — Michelle Iacoletti
(74) *Attorney, Agent, or Firm* — Roeder & Broder LLP

(57) ABSTRACT

Methods and control systems are provided for controlling stage position errors based, in some embodiments, on a selection of frequency components in a stage position error signal. An error frequency representation of a position error signal may be generated in the frequency domain and filtered by selecting one or more desired frequency components. The filtered error frequency representation can then be manipulated according to a control law and transformed back into the time domain to generate a current control signal. The current control signal can then be used to adjust the position of the stage to reduce positioning error.

29 Claims, 9 Drawing Sheets

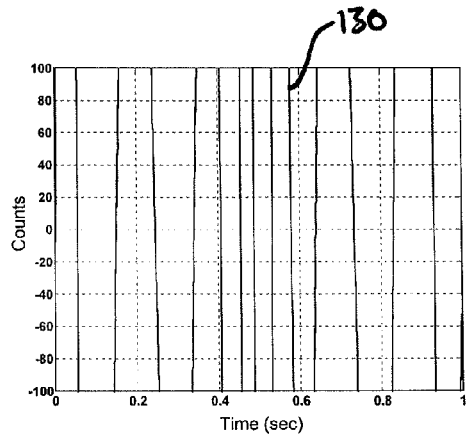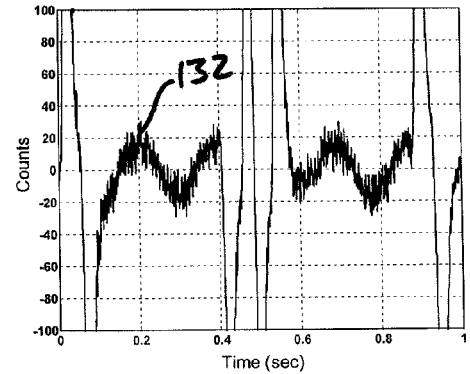
FIG. 8A                FIG. 8B
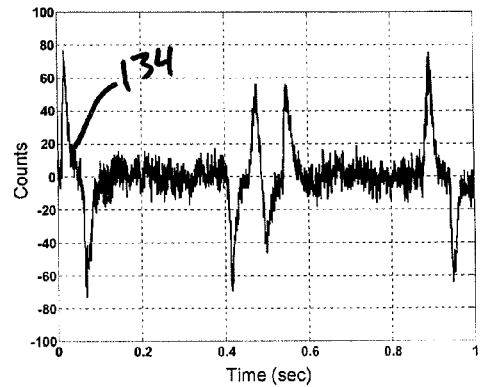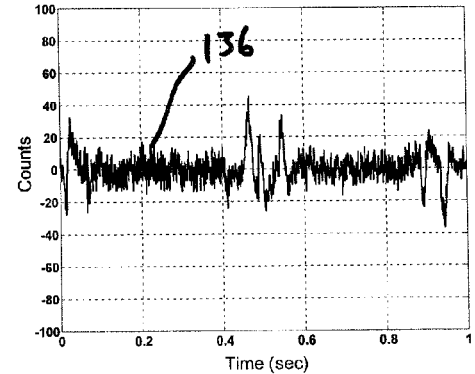
FIG. 8C                FIG. 8D
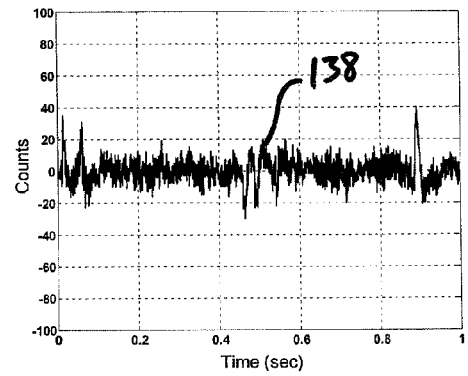
FIG. 8E

FREQUENCY SELECTIVE ITERATIVE LEARNING CONTROL SYSTEM AND METHOD FOR CONTROLLING ERRORS IN STAGE MOVEMENT

FIELD

The present invention relates generally to control systems and methods for controlling the trajectory and alignment of one or more stages in a precision assembly, such as, for example, a semiconductor wafer exposure system. More particularly, the invention relates to reducing a position error of one or more stages through the use of an iterative learning control (ILC) system.

BACKGROUND

An exposure apparatus is one type of precision assembly that is commonly used to transfer images from a mask to a substrate in various manufacturing processes. A typical exposure apparatus usually includes one or more stages or plants for retaining and moving the mask and/or the substrate. One example of an exposure apparatus is a photolithographic machine called a wafer scanner or wafer stepper, which performs one of the many essential steps in the manufacturing process of integrated circuits (ICs). The wafer scanner or stepper includes a reticle stage that retains a reticle, i.e., mask, and a wafer stage that retains a semiconductor wafer, i.e., substrate. During the manufacturing process, a control system generates signals (e.g., voltage or current) that generate forces to drive several actuators that control the position of the reticle stage and/or wafer stage relative to an illumination source and optical assembly with high precision.

As the circuitry on ICs become smaller, the precision required for controlling movement of the stages increases proportionally. In order to meet specifications that are currently on the order of nanometers, control systems require careful design. Precise positioning of the wafer and the reticle relative to the optical assembly is critical to the manufacture of high density, semiconductor wafers.

During stage movement, a stage may experience a positioning error quantified as the difference between an intended or desired trajectory of the stage and an actual trajectory of the stage at a specified time. Errors such as these can occur, for example, because of a lack of complete rigidity in the components of the exposure apparatus or because of periodic vibration disturbances of various mechanical structures. As a result, precision in the manufacture of the semiconductor wafers can be compromised, potentially leading to issues in production quality and throughput.

Attempts to decrease positioning errors generally include the use of feedback control loops and feed-forward based compensation schemes. Additional control techniques such as iterative learning control (ILC) provide options for significantly improving the tracking performance (when compared to only conventional feedback and feed-forward control) of processes or systems that execute the same trajectory, motion or operation repetitively. For example, a control system may repeatedly perform the same movements to image numerous identical ICs on the same semiconductor wafer. In addition, a control system may repeatedly perform the same, repetitive, stage motions as multiple identical wafers are imaged. For these types of systems, feed-forward ILC can be applied to improve system performance by reducing or eliminating repetitive errors.

Even recognizing the accomplishments of these existing control systems in reducing positioning error, there is significant room for improvement in error handling. Along with the ever-present desire to manufacture smaller ICs and other micro-devices comes a requirement for even more precise stage movement with smaller positioning errors. Thus, there is a need for control methods and systems that can improve the accuracy in the positioning of one or more stages of a precision assembly. Further, there is a need for control systems that can accurately adjust the positioning of the wafer stage and/or the reticle stage in an exposure apparatus to produce higher quality semiconductor wafers.

SUMMARY

According to a first aspect of the invention, a method for controlling movement of a precision assembly stage using an iterative learning control system is provided. The control method generally includes positioning a stage of a precision assembly based on a desired trajectory or reference position and generating an error signal reflecting a difference between the desired trajectory and an actual trajectory of the stage. As provided in some embodiments, the control method also generally includes the steps of generating an error frequency representation of the error signal, selecting one or more frequency components of the error frequency representation to generate a filtered error frequency representation, generating a current control frequency representation based on the filtered error frequency representation, generating a current control signal as a function of time based on the current control frequency representation, and using the current control signal to control movement of the stage.

In some embodiments, the one or more frequency components are preferably selected based on an expected frequency range of repetitive positioning errors exhibited by the precision assembly. Upon selecting the one or more frequency components, the method can include passing the one or more frequency components unaltered. Those frequency components not selected may be suppressed, for example, by zeroing the unselected frequency components in the filtered error frequency representation.

In certain embodiments, the control method preferably includes generating the current control frequency representation based additionally on a frequency response of an inverse transfer function of the control system. The frequency response may be modeled and/or calculated. In some embodiments, the frequency response is preferably a measured response, for example, a previously stored actual frequency response of the control system obtained through experimentation.

Some exemplary current control frequency representations may additionally be based on a previous control frequency representation, such as in an iterative control loop. The current control frequency representation may be stored for use in a next iterative control cycle. In some cases the current control frequency representation is stored in a complex form whereby phase information of the current control frequency representation is also stored.

According to at least one embodiment, the control method preferably generates the error frequency representation using a Fast Fourier Transform to transform the error signal from the time domain into the frequency domain. After selecting desired frequency components and generating the current control frequency representation in the frequency domain, an inverse Fast Fourier Transform may preferably be used to transform the current control frequency representation into the time domain to generate the current control signal, which can then be used to control movement of the stage.

According to another aspect of the invention, a method of operating an exposure apparatus, for example, a photolithography apparatus, is provided. The method includes transporting a substrate with a stage having a plurality of linear motors while controlling the plurality of linear motors using an exemplary control method according to an embodiment of the invention. The method further includes exposing the substrate with radiant energy. Another aspect of the invention includes a method of making a micro-device, for example, an integrated circuit or LCD display panel, or a wafer, wherein the method includes at least a photolithography process using a method of operating an exposure apparatus.

Another aspect of the invention provides a control system for controlling movement of a precision assembly stage with the use of an iterative learning controller. The control system includes a first signal transformer configured to generate an error frequency representation of a stage position error signal. A frequency selection module is preferably coupled to the first signal transformer and configured to generate a filtered error frequency representation. The filtered error frequency representation includes one or more selected frequency components of the error frequency representation. An iterative control generator including one or more modules is coupled to the frequency selection module. The iterative control generator is preferably configured to generate a current control frequency representation based on the filtered error frequency representation. A second signal transformer coupled to the iterative control generator generates a current control signal based on the current control frequency representation as a function of time. The current control signal can be used for correcting the repeatable positioning error of the stage. In a preferred embodiment, the first signal transformer includes a Fast Fourier Transform and the second signal transformer includes an inverse Fast Fourier Transform.

In a preferred embodiment, the control system further includes a stage control system that receives a position reference signal and includes an error signal generator coupled to an input to generate a position error signal based on the position reference signal and an actual position of the stage. The control system also includes a controller coupled to the error signal generator, which is configured to generate a force command signal that is sent to the stage to move the stage based on the position error signal.

In some embodiments, the control system includes a memory that stores a previous control frequency representation. In such a case, the iterative control generator preferably generates the current control frequency representation additionally based on the previous control frequency representation. The previous control frequency representation may be stored in a complex form in order to preserve both magnitude and phase information of the previous control frequency representation.

Certain exemplary iterative control generators also generate the current control frequency representation additionally based on a frequency response of an inverse system transfer function. The frequency response of an inverse transfer function may be modeled or calculated from a response of the transfer function. Alternatively, the control system may include a memory storing one or more actual frequency responses of the inverse system transfer function previously calculated from a measured transfer function through experimentation.

According to some embodiments, the frequency selection module selects frequency components within an expected frequency range of repetitive positioning errors exhibited by the precision assembly. Selected frequency components may be passed through unaltered to the filtered error frequency representation, while unselected frequency components are preferably suppressed, for example, by zeroing the unselected components in the filtered error frequency representation.

In another aspect of the invention, a precision assembly is provided that includes a stage that retains an object and also an exemplary control system such as one of those already described to control the movement of the stage that retains the object. Another aspect of the invention includes an exposure apparatus having the precision assembly and an illumination system that irradiates radiant energy. The precision assembly is configured to carry the object on a path of the radiant energy.

Another aspect of the invention is directed to a control system for controlling movement of a precision assembly stage, which includes a stage control system and an iterative learning control module. The stage control system has a controller configured to generate a force command signal to move a stage of a precision assembly. In some embodiments, the iterative learning control module preferably includes a programmable processor and a computer-readable storage medium. The storage medium includes instructions for causing the programmable processor to perform a method for controlling movement of the stage, the method involving generating an error frequency representation of a stage position error signal, selecting one or more frequency components of the error frequency representation to generate a filtered error frequency representation, generating a current control frequency representation of a current control signal based on the filtered error frequency representation, generating the current control signal from the current control frequency representation, and outputting the current control signal to the stage control system to control movement of the stage.

BRIEF DESCRIPTION OF THE DRAWINGS

FIGS. 8A-8E are plots illustrating error reduction after successive iterations of a method of controlling movement of a stage according to an embodiment of the invention;

DETAILED DESCRIPTION OF THE PREFERRED EMBODIMENTS

Figure 1:
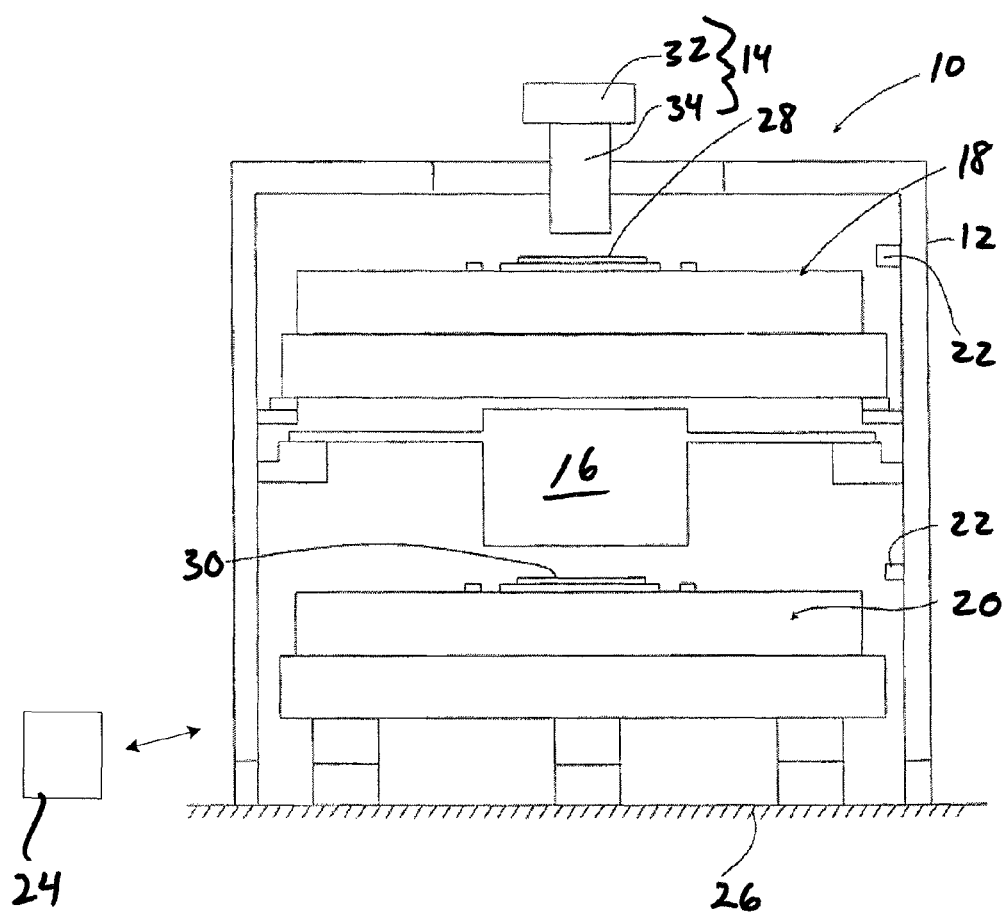
FIG. 1 is a schematic view of an exposure apparatus according to an embodiment of the invention.

The following detailed description should be read with reference to the drawings, in which like elements in different drawings are numbered identically. It will be understood that embodiments shown in the drawings and described herein are merely for illustrative purposes and are not intended to limit the invention to any embodiment. On the contrary, it is intended to cover alternatives, modifications, and equivalents as may be included within the scope of the invention as defined by the appended claims.

Embodiments of the present invention provide, among other things, control systems and methods for controlling the movement of one or more stages of a precision assembly. According to some embodiments, the invention provides control systems and methods for controlling stage movement that are particularly suited for use in a type of exposure apparatus. For example, such an exposure apparatus can be a photolithography device such as a scanner or stepper for producing micro-devices such as semiconductor wafers, flat panel displays (LCD), or thin-film magnetic heads (TFH). However, the invention is not restricted to any particular implementation and may be useful in positioning a stage in a variety of precision assemblies.

FIG. 1 is a schematic illustration of a type of precision assembly, namely an exposure apparatus 10 having features of the present invention. The exposure apparatus 10 includes a frame 12, an illumination system 14 (irradiation apparatus), an optical assembly 16, a reticle stage assembly 18, a wafer stage assembly 20, a measurement system 22, and a control system 24. The exposure apparatus 10 mounts to a mounting base 26, e.g., the ground, a base, or floor or some other supporting structure. The design of the components of the exposure apparatus 10 can be varied to suit the design requirements of a particular implementation of the exposure apparatus 10. As will be discussed further herein, in certain embodiments, the control system 24 controls the movement of one or both of the stage assemblies 18, 20 with the use of an iterative learning control (ILC) system that corrects for stage positioning errors due to, for example, repetitive disturbances.

The exposure apparatus 10 is particularly useful as a lithographic device for semiconductor manufacturing. There are a number of different types of such lithographic devices. For example, the exposure apparatus 10 can be used as a scanning type photolithography system that exposes a pattern from a reticle 28 onto a wafer 30 with the reticle 28 and the wafer 30 moving synchronously. In a scanning type lithographic device, the reticle 28 is moved perpendicularly to an optical axis of the optical assembly 16 by the reticle stage assembly 18 and the wafer 30 is moved perpendicularly to the optical axis of the optical assembly 16 by the wafer stage assembly 20. Scanning of the reticle 28 and the wafer 30 occurs while the reticle 28 and the wafer 30 are moving synchronously.

Alternatively, the exposure apparatus 10 can be a step-and-repeat type photolithography system that exposes the reticle 28 while the reticle 28 and the wafer 30 are stationary. In the step and repeat process, the wafer 30 is in a constant position relative to the reticle 28 and the optical assembly 16 during the exposure of an individual field. Subsequently, between consecutive exposure steps, the wafer 30 is consecutively moved with the wafer stage assembly 20 perpendicularly to the optical axis of the optical assembly 16 so that the next field of the wafer 30 is brought into position relative to the optical assembly 16 and the reticle 28 for exposure. Following this process, the images on the reticle 28 are sequentially exposed onto the fields of the wafer 30, and then the next field of the wafer 30 is brought into position relative to the optical assembly 16 and the reticle 28.

Of course, the use of the exposure apparatus 10 provided herein is not limited to a photolithography system for semiconductor manufacturing. The exposure apparatus 10, for example, can be used as an LCD photolithography system that exposes a liquid crystal display device pattern onto a rectangular glass plate or a photolithography system for manufacturing a thin film magnetic head. Further, the present invention can also be applied to a proximity photolithography system that exposes a mask pattern from a mask to a substrate with the mask located close to the substrate without the use of a lens assembly. In addition, the exposure apparatus 10 is merely one example of a precision assembly. In some embodiments, features of the invention may be useful for any type of precision assembly requiring high precision and accuracy in stage movement.

Referring again to FIG. 1, the apparatus frame 12 is rigid and supports the components of the exposure apparatus 10. The apparatus frame 12 supports the reticle stage assembly 18, the optical assembly 16 and the illumination system 14 above the mounting base 26.

The illumination system 14 includes an illumination source 32 and an illumination optical assembly 34. The illumination source 32 emits a beam (irradiation) of light energy. The illumination optical assembly 34 guides the beam of light energy from the illumination source 32 to the optical assembly 16. The beam selectively illuminates different portions of the reticle 28 to expose the wafer 30. In FIG. 1, the illumination source 32 is illustrated as being supported above the reticle stage assembly 18. The illumination source 32 may, however, be secured to one of the sides of the apparatus frame 12 with the energy beam from the illumination source 32 directed to above the reticle stage assembly 18 with the illumination optical assembly 34.

The illumination source 32 can be a g-line source (436 nm), an i-line source (365 nm), a KrF excimer laser (248 nm), an ArF excimer laser (193 nm) or a $F_2$ laser (157 nm). Alternatively, the illumination source 32 can generate charged particle beams such as an x-ray or an electron beam. For instance, in the case where an electron beam is used, thermionic emission type lanthanum hexaboride ($LaB_6$) or tantalum (Ta) can be used as a cathode for an electron gun. Furthermore, in the case where an electron beam is used, the structure could be such that either a mask is used or a pattern can be directly formed on a substrate without the use of a mask.

The optical assembly 16 projects and/or focuses the light passing through the reticle 28 to the wafer 30. Depending upon the design of the exposure apparatus 10, the optical assembly 16 can magnify or reduce the image illuminated on the reticle 28. The optical assembly 16 need not be limited to a reduction system, but could also be a 1× or magnification system.

When far ultra-violet rays such as the excimer laser is used, glass materials such as quartz and fluorite that transmit far ultra-violet rays can be used in the optical assembly 16. When the $F_2$ type laser or x-ray is used, the optical assembly 16 can be either catadioptric or refractive (a reticle should also preferably be a reflective type), and when an electron beam is used, electron optics can consist of electron lenses and deflectors. The optical path for the electron beams should be in a vacuum.

Also, with an exposure apparatus that employs vacuum ultra-violet radiation (VUV) of wavelength 200 nm or lower, use of a catadioptric type optical system incorporating, for example, a beam splitter and concave mirror can be considered. The exposure apparatus may also use a reflecting-refracting type of optical system incorporating a concave mirror, etc., but without a beam splitter.

The reticle stage assembly 18 includes one or more reticle stages and actuators that hold and position the reticle 28 relative to the optical assembly 16 and the wafer 30. Somewhat similarly, the wafer stage assembly 20 includes one or more wafer stages and actuators that retain and move the wafer 30 with respect to the projected image of the illuminated portions of the reticle 28.

The reticle and wafer stage assemblies may include a variety of actuators for moving the stages depending upon the particular implemented design. For example, in photolithography systems, when linear motors (see, for example, U.S. Pat. Nos. 5,623,853 and 5,528,118, both of which are herein incorporated by reference) are used to move a wafer stage or a mask stage, the linear motors can be either an air levitation type employing air bearings or a magnetic levitation type using Lorentz force or reactance force. Additionally, a stage could move along a guide, or it could be a guideless type stage that uses no guide.

Alternatively, one of the stages could be driven by a planar motor, which drives the stage by an electromagnetic force generated by a magnet unit having two-dimensionally arranged magnets and an armature coil unit having two-dimensionally arranged coils in facing positions. With this type of driving system, either the magnet unit or the armature coil unit is connected to the stage and the other unit is mounted on the moving plane side of the stage.

The measurement system 22 monitors the actual position and movement of the reticle 28 and the wafer 30 relative to the optical assembly 16 or some other reference. For example, the measurement system 22 can utilize multiple laser interferometers, encoders, and/or other measuring devices to determine the actual position of the one or more stages in the reticle stage assembly 18 and/or the wafer stage assembly 20. This information is communicated to the control system 24, which is connected between the reticle stage assembly 18, the wafer stage assembly 20, and the measurement system 22. The control system 24 includes one or more processing modules (implemented in, e.g., hardware, firmware, or software) which process the position information in order to control the reticle stage assembly 18 to precisely position the reticle 28 and the wafer stage assembly 20 to precisely position the wafer 30.

Figure 2:
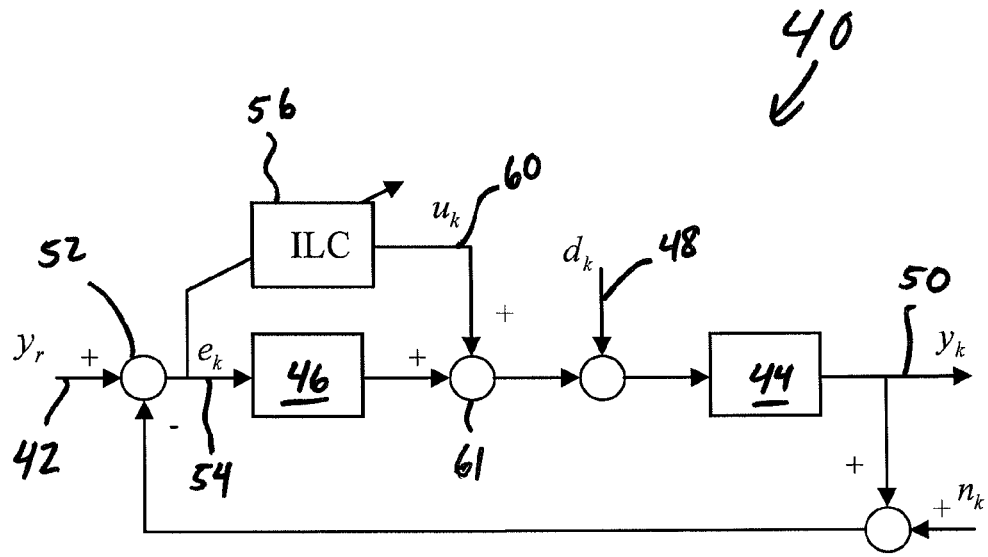
FIG. 2 is a block diagram of a control system employing an iterative learning control according to an embodiment of the invention.

Turning now to FIG. 2, a high-level depiction of a control system 40 for controlling the movement of a stage in an exposure apparatus is shown in accordance with an embodiment of the invention. In general terms, the control system 40 has an input for receiving a position reference signal, $y_r$, 42 indicating a desired trajectory for moving a stage 44. The control system 40 forwards the desired trajectory to a controller 46, which generates a force command for moving the stage 44. The force command is sent to the stage assembly, where it signals one or more stage actuators to move the stage 44 along the desired trajectory.

As is well known, disturbances 48 from various mechanical structures of the exposure apparatus may introduce a positioning or following error into the system that affects the trajectory of the stage 44. To monitor the stage 44 position, a measurement system (not shown), such as the measurement system 22 in FIG. 1, senses the movement of the stage 44 and generates a position signal, $y_k$, 50 indicating the actual position of the stage 44. The position signal 50 is fed back to the input of the control loop (along with some amount of measurement noise $n_k$) to adjust the stage position. As shown in FIG. 2, the control system 40 includes a summation node 52 that generates a position error signal, $e_k$, 54, indicative of the difference between the stage's actual trajectory and the desired trajectory. This error signal 54 is forwarded to the controller 46 to generate a new force command for the stage actuators. In some embodiments, the control system 40 may employ other measures to correct the positioning error, including, but not limited to, a trajectory feedforward loop.

For an exposure apparatus or other precision assembly that experiences repetitive positioning errors associated with repeated, identical stage movements, further measures may be desirable to reduce the repetitive error. For example, a wafer stepper experiences repetitive errors due to the repetitive pattern of the step-scan-and-repeat steps. In some embodiments of the invention, the control system 40 includes an iterative learning controller (ILC) 56 that greatly diminishes the effect of repetitive positioning errors.

Iterative learning control (ILC) has been intensely studied and applied to many control systems with repetitive motions. In contrast to the general compensations, based on the information of previous time steps, the ILC incrementally adjusts its control command to reduce the positioning error based on the information from the previous iterations of repetitive motion. After several learning iterations in which the following error is reduced to an acceptable level, the final ILC correction signal may be saved in memory and later retrieved and applied as a feedforward control for a similar trajectory without repeating the learning process. In addition, the correction signal can later be adjusted to account for changes in the repeatable error by running one or more additional iterations at a later time.

In general, the ILC 56 receives and processes the error signal, $e_k$, 54 in order to generate and output a command control signal, $u_k$, for countering the repeating error. As shown in FIG. 2, in some cases the ILC 56 may be positioned within the control system 40 such that its control signal, $u_k$, 60, is added to the system controller's force command at a summing junction 61. The configuration in FIG. 2 is sometimes referred to as a "force ILC" configuration.

Figure 3:
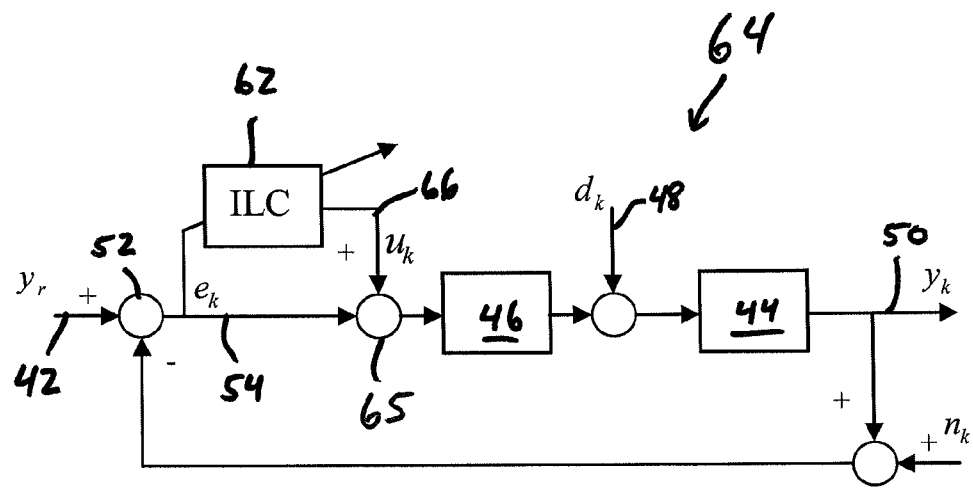
FIG. 3 is a block diagram of another control system employing an iterative learning control according to an embodiment of the invention.

FIG. 3 illustrates another configuration. In the depicted embodiment, a ILC 62 is positioned within a control system 64 prior to the system controller 46. This configuration allows the ILC 62 to compensate for the position error by modifying the position error signal 54 before it reaches the controller 46. The ILC's control signal, $u_k$, 66, is added to the position error signal 54 at a summing junction 65. The configuration in FIG. 3 is sometimes referred to as an "error ILC" configuration.

Those skilled in the art will appreciate that the ILC may be placed in other configurations as long as the ILC control law is appropriately modified. In general, a typical ILC receives the error signal, $e_k$, 54 and processes it in the time domain according to Equation 1, $$u_{k+1}(n) = u_k(n) + QLe_k(n) \quad (1)$$

where n is the sample number, ranging from 0 to p samples, Q is a low pass filter, L is a forward filter representing an inverse transfer function of the system, and k represents the current iteration.

While this is to some degree effective at reducing repetitive stage positioning errors, room exists for improvement. For example, the bandwidth of the low pass Q filter may limit the stability and effectiveness of the system. Low pass Q filters can have a high frequency ripple and as such offer less than perfect filtering at high frequencies. Numerous learning iterations are often required to average out the effect of high frequency noise and non-repetitive disturbances. In addition, the ILC learning gain is often lowered to reduce these types of effects, thus requiring an increased number of learning iterations to achieve the desired error reduction. Aspects of the invention address these and other concerns.

Figure 4:
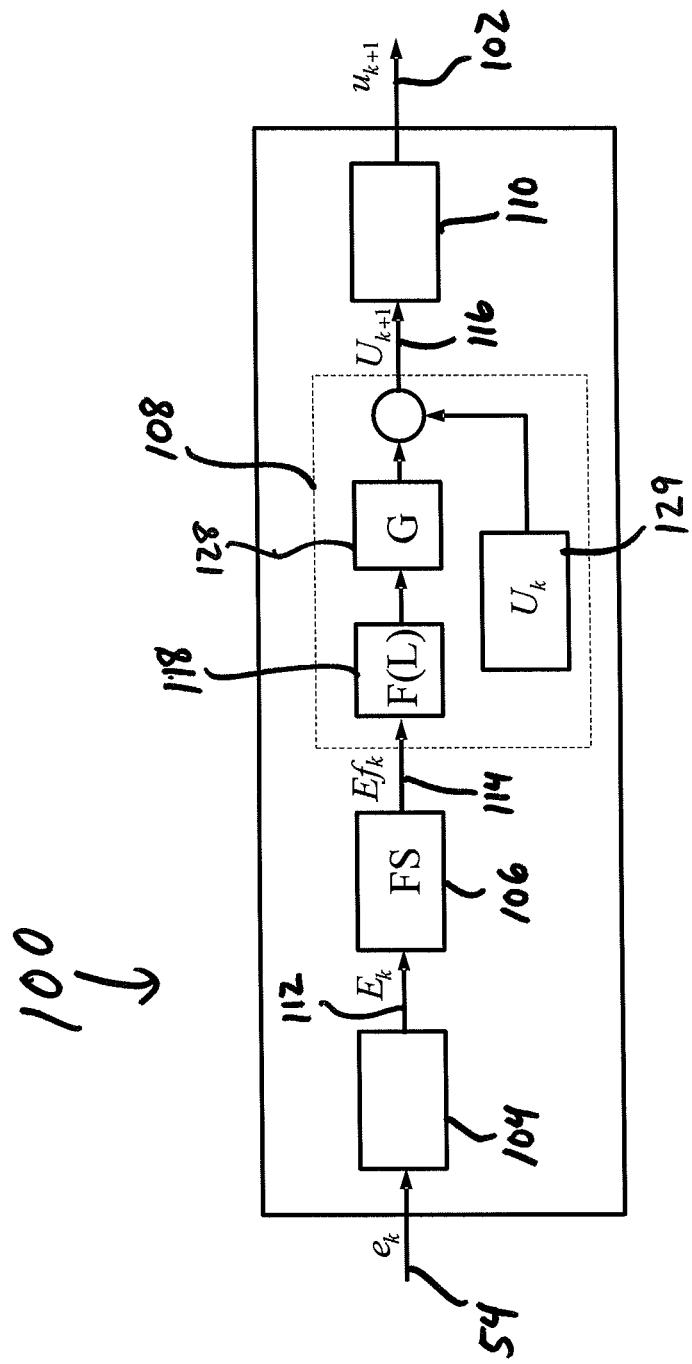
FIG. 4 is a block diagram of an iterative learning controller according to an embodiment of the invention.

FIG. 4 is a block diagram of an iterative learning controller (ILC) 100 having features of the invention in accordance with a preferred embodiment. In brief, the exemplary ILC 100 receives an error signal, $e_k$, 54 that it processes to generate a current control signal, $u_{k+1}$, 102 that can be used to correct repetitive stage position errors similarly to a conventional ILC. However, the ILC 100 includes features of the invention that produce an improved ILC control signal 102.

As shown in FIG. 4, the ILC 100 of this embodiment includes a first signal transformer 104, a frequency selection module 106, an iterative control generator 108, and a second signal transformer 110. According to this embodiment, the ILC 100 generates an improved ILC control signal 102 by converting the stage error position signal 54 into the frequency domain where it is processed. This provides a number of advantages over conventional time-based ILC processing. For example, by processing the error signal 54 in the frequency domain, a set of frequency components corresponding to known error frequencies can be selected and processed, providing an improved filtering technique in place of conventional Q filters.

In accordance with a preferred embodiment, the first signal transformer 104 receives the error signal 54 and generates an error frequency representation, $E_k$, 112 based on the error signal 54. The error frequency representation 112 may generally be thought of as a representation of the time-based error signal 54 in the frequency domain. For example, the first signal transformer 104 can sample the error signal 54 to generate a sampled error signal with p samples. The sampled error signal is then converted into the frequency domain with a transform such as the discrete Fourier transform, as in Equation 2, $$E_k = \sum_{n=0}^{p-1} e_n \exp^{-\frac{2\pi i}{p} kn} \quad (2)$$

or with a Fast Fourier Transform, as in Equation 3.

$$E_k(1), \ldots, E_k(p) = \text{FFT}(e_k(1), \ldots, e_k(p)) \quad (3)$$

The frequency selection module 106 receives the error frequency representation and in turn generates a filtered error frequency representation, $Ef_k$, 114 having a number of frequency components selected from the error frequency representation 112. In some embodiments of the invention, the error frequency representation 112 is kept in complex form $$E_k(n) = a_n + b_n j \quad (4)$$

and generally has frequency components at m points:

$$\text{Frequencies} = 0, \frac{1}{2mT_s}, \frac{2}{2mT_s}, \ldots, \frac{m-1}{2mT_s}, \frac{1}{2T_s} \quad (5)$$

where there are p number of samples, $T_s$ is the sampling period, and m is $$m = \text{floor}\left(\frac{p-1}{2}\right) \quad (6)$$

In some cases repetitive errors may be known to occur at specific frequencies. As such, in some embodiments of the invention, a set of frequency components may be selected from the error frequency representation 112 based on an expected frequency range of repetitive positioning errors exhibited by the exposure apparatus, i.e., precision assembly. Those skilled in the art will appreciate that in selecting certain frequency components, the frequency selection module may be selecting conjugate pairs of components. As an example, selecting the first three frequency components would yield:

$E_k(1) = a_1$ $E_k(2) = a_2 + b_2 j$ and $E_k(p) = a_2 - b_2 j$ $E_k(3) = a_3 + b_3 j$ and $E_k(p-1) = a_3 - b_3 j$ After deciding which frequency components to keep, the frequency selection module 106 may in some fashion amplify these components, or conversely, reduce or suppress unselected frequency components. For example, in some embodiments the frequency selection module 106 may pass on the selected frequency components unaltered and zero out all unselected frequency components.

Figure 5:
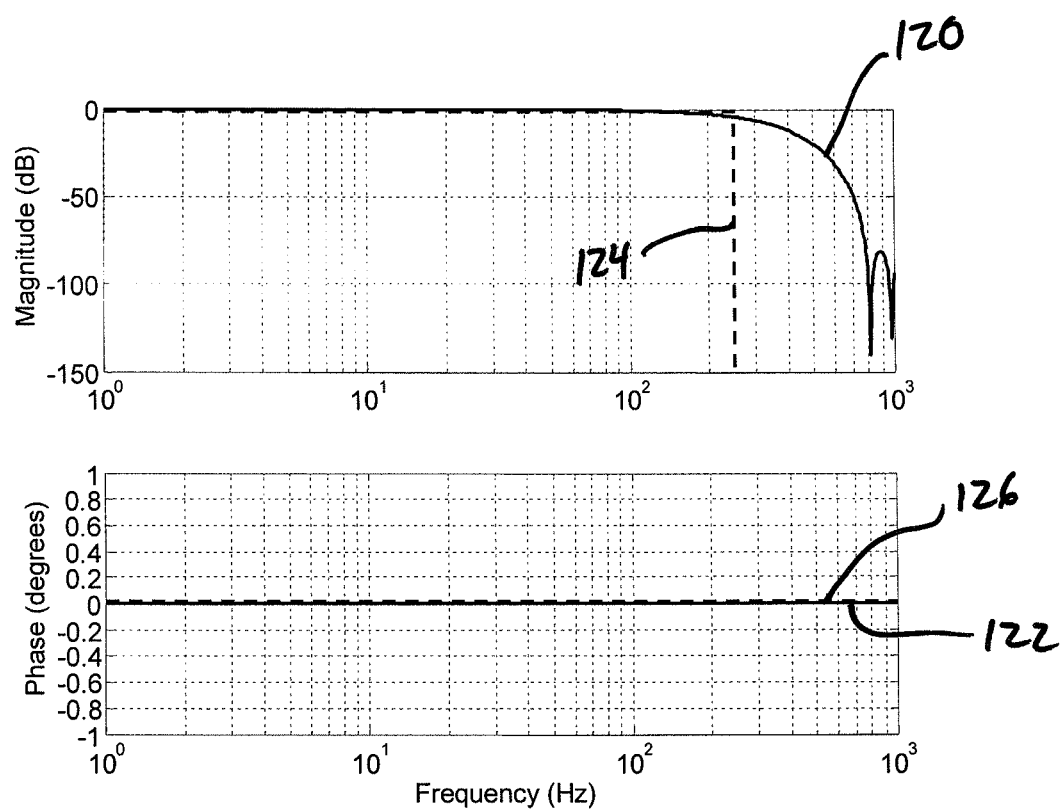
FIG. 5 depicts frequency characteristics of an iterative learning controller according to an embodiment of the invention compared to a conventional iterative learning controller.

The ability to discretely select one or more frequency components from the error signal allows the ILC 100 to provide excellent, if not near-perfect, filtering when compared with a traditional low pass Q filter. Referring briefly to FIG. 5, the magnitude 120 and phase 122 of a conventional ILC filter are plotted over the magnitude 124 and phase 126 of the filtering provided by an ILC in accordance an embodiment of the invention. As can be seen, the inventive ILC can provide a theoretically perfect cut-off frequency, thus providing superior filtering over the traditional, time domain Q filter, which often exhibits a slow drop off from the corner frequency and high frequency ripples. Further, the frequency selection module 106 is not limited to behaving as a low pass filter, but may pass any desired combination of frequency components. For example, the frequency selection module 106 may simulate a band-pass or band-stop filter, or selectively choose one or more higher frequency components in the case that repetitive errors occur at high frequencies.

Referring again to FIG. 4, the filtered error frequency representation 114 is passed to an iterative control generator 108, which applies a control law to generate a current control frequency representation, $U_{k+1}$, 116 based on the filtered error frequency representation 114. For example, in some embodiments the iterative control generator 108 includes a learning module 118 applying a frequency response, F(L), of an inverse system transfer function. The control generator 108 may also include a gain module 128 applying an iterative learning gain, G. In certain embodiments the increased filtering accuracy of the frequency selection module 106 allows a higher learning gain, G, with less concern than in conventional applications that unwanted disturbances and noise will be amplified. Accordingly, a higher learning gain can further decrease the number of learning iterations needed to achieve the desired error reduction.

In some embodiments, the iterative control generator 108 generates the current control frequency representation 116 additionally based on a previous control frequency representation, $U_k$, provided by a previous control module 129. The ILC 100 may have one or more memory modules for storing one or more previous control frequency representations.

Advantageously, the frequency components of the previous representations may be stored in complex form to preserve phase information. Further, because the filtered error frequency representation 114 includes only a selected number of frequency components, less memory is required to store the current control frequency representation than the learned output in a conventional time domain ILC. As such, the sampling length may be increased and/or the ILC 100 may be able to save learned control signals for a greater number of stage positions.

Thus, according to some embodiments of the invention, the ILC 100 generates successive current control frequency representations (according to the number of iterations, k) as shown in Equation 7.

$$U_{k+1} = U_k + GLEf_k \quad (7)$$

As discussed above, the learning module 118 applies the frequency response, F(L), of the inverse system transfer function to the filtered error frequency representation 114. The inverse transfer function for a force ILC configuration and an error ILC configuration are as follows:

$$L_{Force} = \left(\frac{P}{1+PC}\right)^{-1} \quad (8)$$

$$L_{Error} = \left(\frac{PC}{1+PC}\right)^{-1} \quad (9)$$

where C represents the controller dynamics and P represents the plant or stage dynamics.

In some cases these inverse transfer functions may be modeled by the learning module 118 to provide an approximate frequency response. However, models for L can be somewhat inaccurate at middle and high frequencies, thus increasing the overall number of iterations required to achieve an acceptable error tolerance.

Figure 6A:
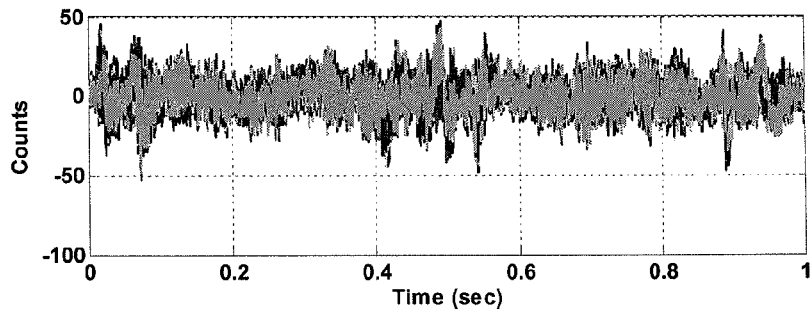
FIG. 6A-6B are plots illustrating error reduction after operation of an iterative learning control method employing a modeled inverse system transfer function according to an embodiment of the invention.
Figure 6B:
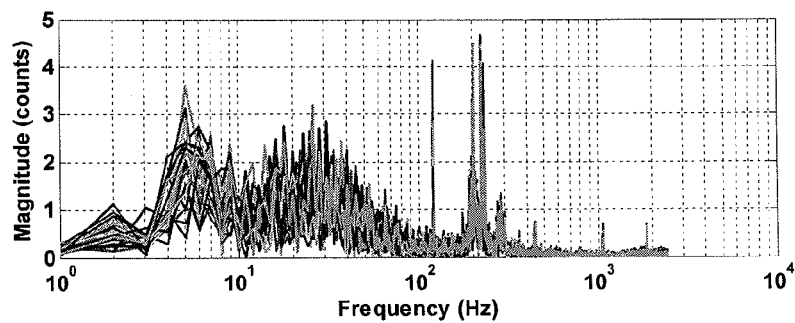
Figure 7A:
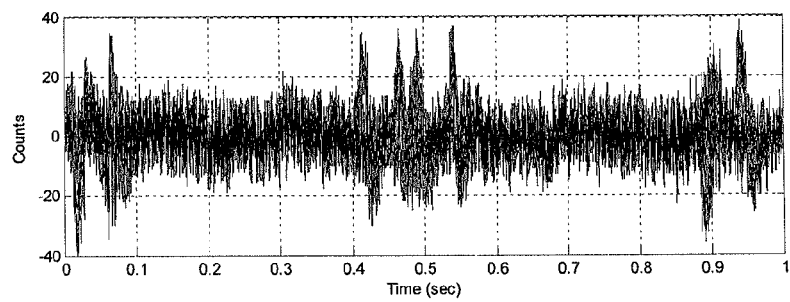
FIGS. 7A-7B are plots illustrating error reduction after operation of an iterative learning control method employing a measured inverse system transfer function according to an embodiment of the invention.
Figure 7B:
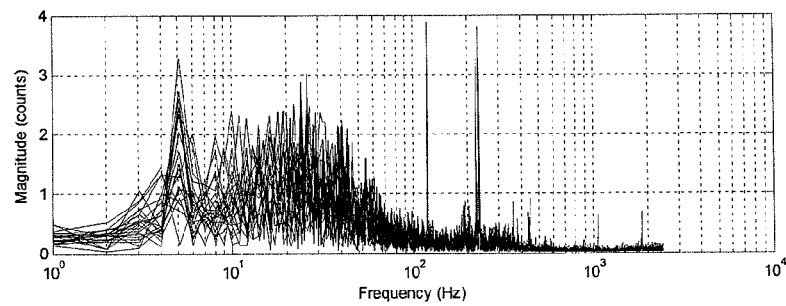

According to some embodiments, the learning module 118 may store in memory actual frequency responses, previously measured across the system. This approach provides an accurate knowledge of the inverse frequency response, thus increasing learning accuracy and decreasing the number of necessary learning iterations. The plots in FIGS. 6A and 6B show experimental results for the inventive frequency selective ILC using a modeled F(L) over 8 iterations, while FIGS. 7A and 7B show experimental results for measured values for F(L) for 8 iterations according to one embodiment.

As can be seen in the figures, use of the measured frequency response values yields a smaller count deviation than use of the modeled frequency response. Definitions of a "count" vary, but as used herein, a "count" can be considered one unit of deviation from the desired trajectory. In some cases, a count may be the equivalent of 0.62 nm. Table 1 shows the improved performance using measured frequency response for L after 8 iterations.

TABLE 1

|  | Average Max Moving Average (counts) | Average Max Mean Squared Deviation (counts) |
| --- | --- | --- |
| Modeled F(L) | 6.6 | 11.6 |
| Measured F(L) | 4.3 | 6.4 |

Returning to FIG. 4, the ILC 100 includes the second signal transformer 110, which receives the current control frequency representation $U_{k+1}$ and generates the corresponding current control signal, $u_{k+1}$, 102 in the time domain. For example, the second signal transformer 110 may comprise an inverse discrete Fourier transform, or an inverse fast Fourier transform.

$$u_{k+1}(1), \ldots, u_{k-1}(p) = \text{FFT}^{-1}(U_{k+1}(1), \ldots, U_{k+1}(p)) \quad (10)$$

This current control signal 102 can then be sent back to the main system control loop (e.g., as in FIG. 2 or 3) where it can be used to eventually adjust the force command sent to the stage mechanics in order to reduce a repetitive positioning error. In certain embodiments the current control signal 102 may be added directly to the force command, as in the case of a force ILC configuration, while in other embodiments, the current control signal 102 may be added to the position error signal, $e_k$, prior to the system controller.

FIGS. 8A-8E are plots illustrating error reduction after successive iterations of a method of controlling movement of a stage according to certain embodiments. The stage position error after one iteration 130, two iterations 132, three iterations 134, four iterations 136, and five iterations 138 are shown for one example of a force ILC configuration. As can be seen, embodiments of the invention can thus provide dramatic stage position error reduction in some cases after just a few iterations of operation. As will be appreciated, the number of iterations needed will vary according to the system dynamics and the desired error tolerance.

Figure 9:
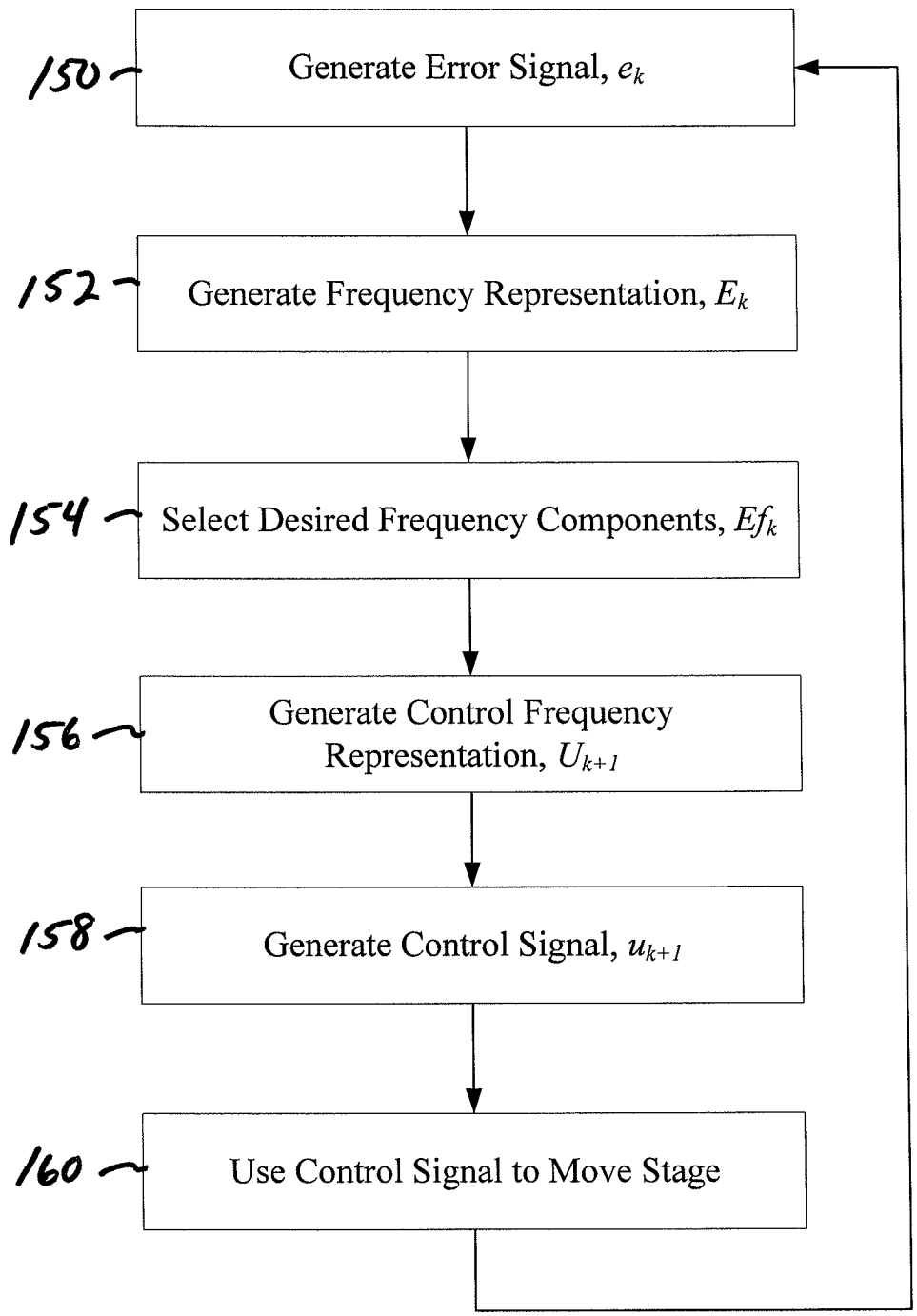
FIG. 9 is a process flow diagram illustrating a method of controlling movement of a stage according to an embodiment of the invention.

Turning to FIG. 9, steps in a method for controlling stage movement using an iterative learning control are illustrated in accordance with certain embodiments of the invention. After positioning a stage of a precision assembly, e.g., exposure apparatus, based on a desired trajectory, an error signal $e_k$ is generated 150 indicating the difference between the stage's actual position and the desired position. The error signal $e_k$ is then processed to generate an error frequency representation $E_k$ 152. One or more desired frequency components are then selected 154 to generate a filtered error frequency response $Ef_k$. This is used to generate a current control frequency representation, $U_{k+1}$, 156, which may optionally be based on the frequency response of an inverse system transfer function, a previous control frequency response, and/or an iterative learning gain. The control frequency representation is then used to generate a current control signal, $u_{k+1}$, 158 in the time domain, which can be used to move a stage 160 and so reduce stage positioning errors. Depending upon the amount of error reduction and the desired error tolerance, the iteration count k may increase by one and the method may repeat to further reduce the positioning error.

In certain embodiments, exemplary control methods and systems may be implemented in variety of ways. For example, control systems may include one or more processing modules implemented in hardware, firmware, or software. In certain embodiments, the invention includes an iterative learning control module coupled to the a stage control system. The iterative learning control module may have at least one programmable processor and one or more computer-readable storage mediums with instructions for causing the processor to carry out a method for controlling stage movement similar to those described above. The storage mediums may also store system variables and parameters, including previous learning control frequency representations, measured frequency responses, expected frequency ranges, as so on.

A photolithography system (e.g., an exposure apparatus) according to the embodiments described herein can be built by assembling various subsystems, including each element listed in the appended claims, in such a manner that prescribed mechanical accuracy, electrical accuracy, and optical accuracy are maintained. In order to maintain the various accuracies, prior to and following assembly, every optical system is adjusted to achieve its optical accuracy. Similarly, every mechanical system and every electrical system are adjusted to achieve their respective mechanical and electrical accuracies. The process of assembling each subsystem into a photolithography system includes mechanical interfaces, electrical circuit wiring connections and air pressure plumbing connections between each subsystem. Needless to say, there is also a process where each subsystem is assembled prior to assembling a photolithography system from the various subsystems. Once a photolithography system is assembled using the various subsystems, a total adjustment is performed to make sure that accuracy is maintained in the complete photolithography system. Additionally, it is desirable to manufacture an exposure system in a clean room where the temperature and cleanliness are controlled.

Figure 10:
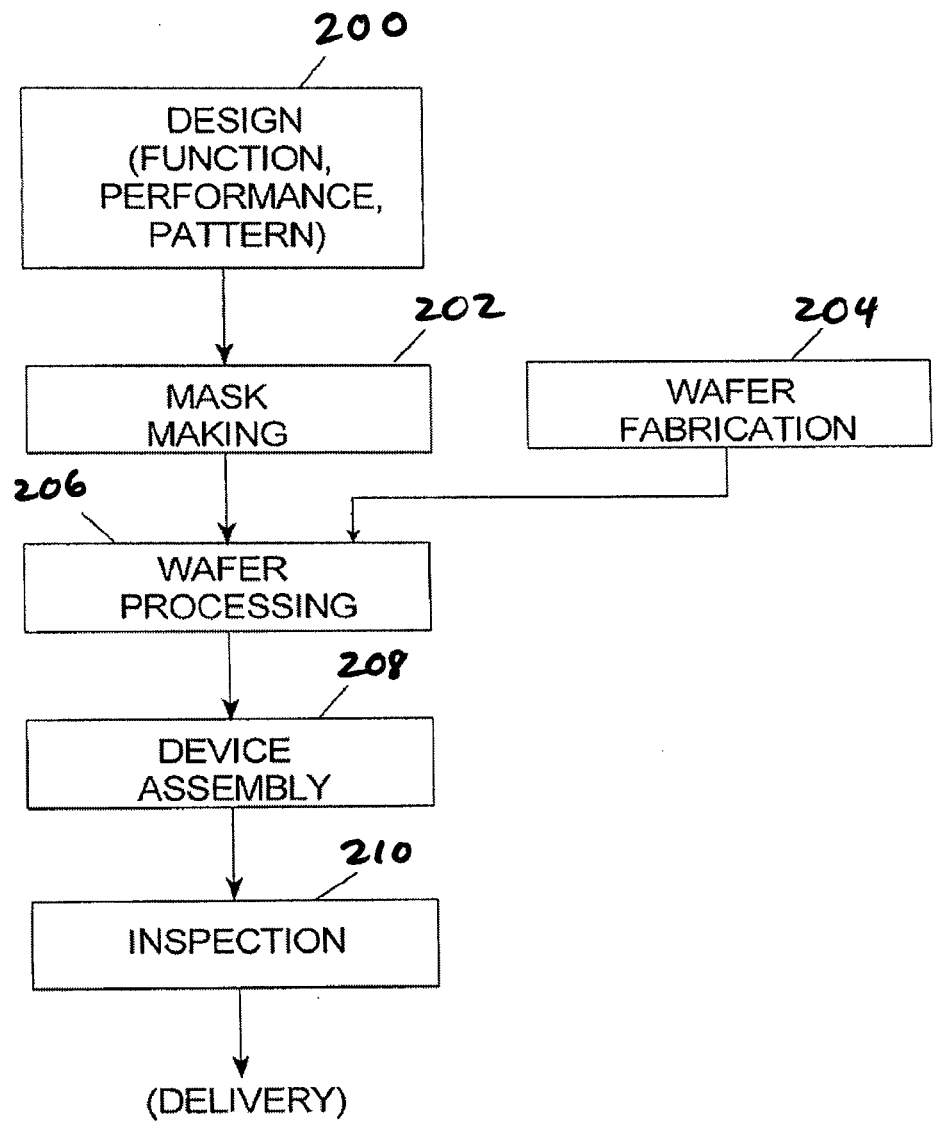
FIG. 10 is a process flow diagram illustrating a method of fabricating a semiconductor device according to an embodiment of the invention.

Further, semiconductor devices may be fabricated using systems described above, as will be discussed with reference to FIG. 10. The process begins at step 200 in which the function and performance characteristics of a semiconductor device are designed or otherwise determined. Next, in step 202, a reticle (i.e., mask) having a pattern is designed based upon the design of the semiconductor device. It should be appreciated that in a parallel step 204, a wafer is made from a silicon material. The mask pattern designed in step 202 is exposed onto the wafer fabricated in step 204 in step 206 by a photolithography system that can include a coarse reticle scanning stage and a fine reticle scanning stage. One process of exposing a mask pattern onto a wafer will be described below with respect to FIG. 11. In step 208, the semiconductor device is assembled. The assembly of the semiconductor device generally includes, but is not limited to, wafer dicing, bonding, and packaging processes. Finally, the completed device is inspected in step 210 and delivered.

Figure 11:
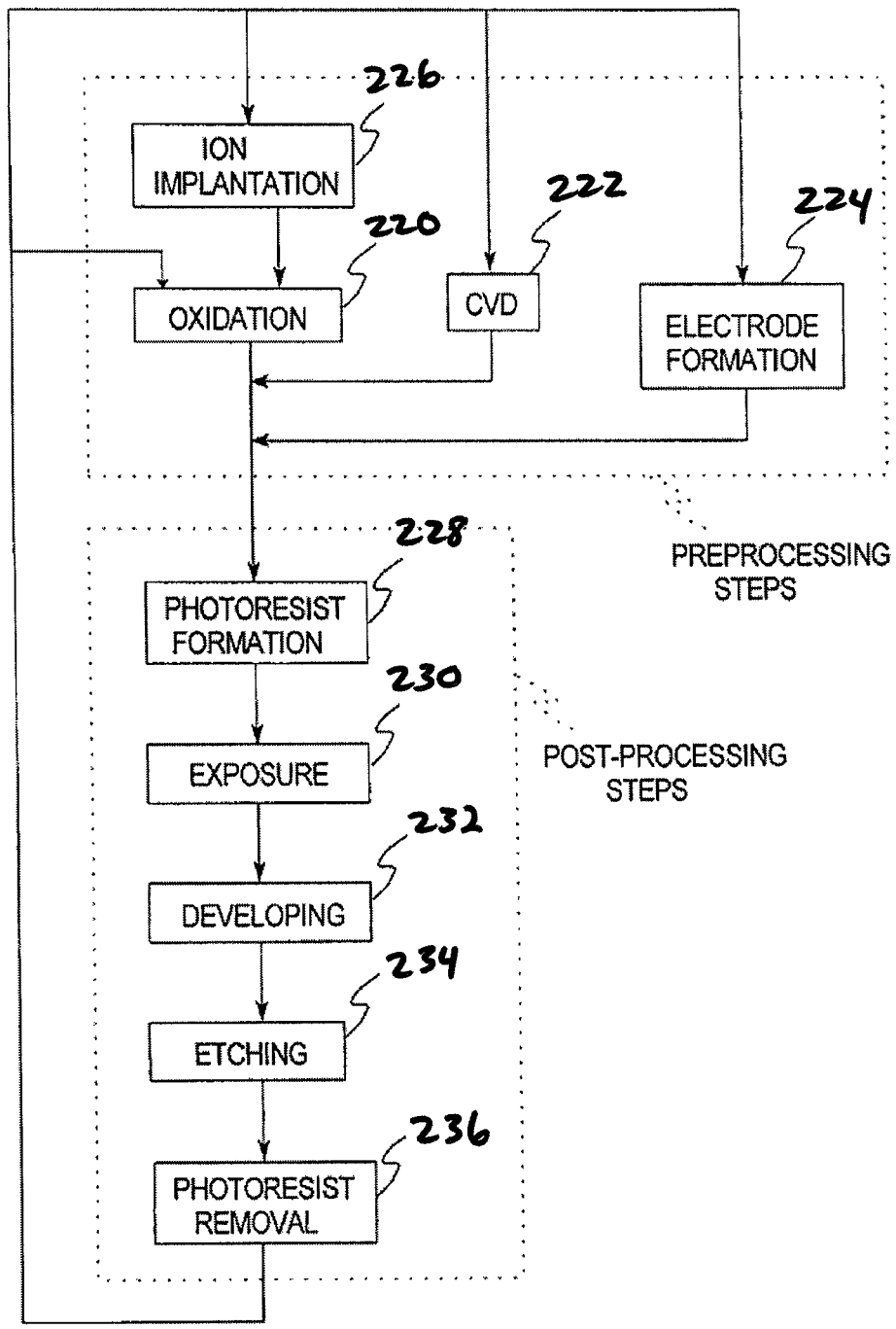
FIG. 11 is a process flow diagram illustrating in detail the method of wafer processing of FIG. 10.

FIG. 11 is a process flow diagram which illustrates the steps associated with wafer processing in the case of fabricating semiconductor devices in accordance with an embodiment of the present invention. In step 220, the surface of a wafer is oxidized. Then, in step 222 which is a chemical vapor deposition (CVD) step, an insulation film may be formed on the wafer surface. Once the insulation film is formed, in step 224, electrodes are formed on the wafer by vapor deposition. Then, ions may be implanted in the wafer using substantially any suitable method in step 226. As will be appreciated by those skilled in the art, steps 220-226 are generally considered to be preprocessing steps for wafers during wafer processing. Further, it should be understood that selections made in each step, e.g., the concentration of various chemicals to use in forming an insulation film in step 222, may be made based upon processing requirements.

At each stage of wafer processing, when preprocessing steps have been completed, post-processing steps may be implemented. During post-processing, initially, in step 228, photoresist is applied to a wafer. Then, in step 230, an exposure apparatus such as one having one or more exemplary systems described herein may be used to transfer the circuit pattern of a reticle to a wafer.

After the circuit pattern on a reticle is transferred to a wafer, the exposed wafer is developed in step 232. Once the exposed wafer is developed, parts other than residual photoresist, e.g., the exposed material surface, may be removed by an etching step 234. Finally, in step 236, any unnecessary photoresist that remains after etching may be removed. As will be appreciated by those skilled in the art, multiple circuit patterns may be formed through the repetition of the preprocessing and post-processing steps.

Thus, embodiments of the ITERATIVE LEARNING CONTROL SYSTEM AND METHOD FOR CONTROLLING ERRORS IN STAGE MOVEMENT are disclosed. Although the present invention has been described in considerable detail with reference to certain disclosed embodiments, the disclosed embodiments are presented for purposes of illustration and not limitation and other embodiments of the invention are possible. One skilled in the art will appreciate that various changes, adaptations, and modifications may be made without departing from the spirit of the invention and the scope of the appended claims.

What is claimed is:

1. A method for controlling movement of a precision assembly stage using an iterative learning control system, comprising:
   positioning a stage of a precision assembly based on a desired trajectory;
   generating an error signal in a time domain reflecting a difference between the desired trajectory and an actual trajectory of the stage;
   generating an error frequency representation of the error signal solely in a frequency domain by transforming the error signal from the time domain to solely the frequency domain;
   selecting one or more frequency components of the error frequency representation in the frequency domain to generate a filtered error frequency representation in the frequency domain;
   generating a current control frequency representation solely in the frequency domain based on the filtered error frequency representation;
   generating a current control signal in the time domain as a function of time based on the current control frequency representation; and
   using the current control signal to control movement of the stage.

2. The method of claim 1, further comprising selecting the one or more frequency components based on an expected frequency range of repetitive positioning errors exhibited by the precision assembly.

3. The method of claim 1, wherein selecting the one or more frequency components comprises passing the one or more frequency components unaltered.

4. The method of claim 3, further comprising suppressing unselected frequency components.

5. The method of claim 4, wherein suppressing the unselected frequency components comprises zeroing the unselected frequency components.

6. The method of claim 1, further comprising generating the current control frequency representation additionally based on a frequency response of an inverse system transfer function.

7. The method of claim 6, wherein the frequency response is a modeled response.

8. The method of claim 6, wherein the frequency response is a measured response.

9. The method of claim 1, further comprising generating the current control frequency representation in the frequency domain additionally based on a previous control frequency representation.

10. The method of claim 9, further comprising storing the current control frequency representation for use in a next iterative control cycle.

11. The method of claim 10, further comprising storing the current control frequency representation in a complex form whereby phase information of the current control frequency representation is also stored.

12. The method of claim 1, wherein generating the error frequency representation comprises using a Fast Fourier Transform to transform the error signal and wherein generating the current control signal comprises using an inverse Fast Fourier Transform to transform the current control frequency representation.

13. A method of operating an exposure apparatus comprising transporting a substrate with a stage having a plurality of linear motors, controlling the plurality of linear motors using the method of claim 1 to move the substrate, and exposing the substrate with radiant energy.

14. A method of making a micro-device including at least a photolithography process, wherein the photolithography process uses the method of operating an exposure apparatus of claim 13.

15. A method for making a wafer using the method of operating an exposure apparatus of claim 13.

16. A control system for controlling movement of a precision assembly stage with use of an iterative learning controller, comprising:
    an input that receives a position reference signal for positioning a stage in a precision assembly;
    an error signal generator coupled to the input that generates a position error signal in a time domain based on the position reference signal and an actual position of the stage;
    a first signal transformer that receives the position error signal and generates an error frequency representation of the position error signal solely in a frequency domain by transforming the error signal from the time domain to solely the frequency domain;
    a frequency selection module coupled to the first signal transformer that generates a filtered error frequency representation in the frequency domain, the filtered error frequency representation including one or more selected frequency components of the error frequency representation;
    an iterative control generator coupled to the frequency selection module that generates a current control frequency representation in the frequency domain based on the filtered error frequency representation;
    a second signal transformer coupled to the iterative control generator that generates a current control signal in the time domain for correcting the positioning error of the stage, the current control signal being a function of time based on the current control frequency representation; and
    a controller coupled to the error signal generator and the second signal transformer that generates a force command signal to move the stage based on the position error signal and the current control signal.

17. The control system of claim 16, wherein the first signal transformer comprises a Fast Fourier Transform and the second signal transformer comprises an inverse Fast Fourier Transform.

18. The control system of claim 16, further comprising a memory storing a previous control frequency representation, wherein the iterative control generator is configured to generate the current control frequency representation in the frequency domain additionally based on the previous control frequency representation.

19. The control system of claim 18, wherein the previous control frequency representation is stored in a complex form whereby phase information of the previous control frequency representation is also stored.

20. The control system of claim 16, wherein the iterative control generator is configured to generate the current control frequency representation additionally based on a frequency response of an inverse system transfer function.

21. The control system of claim 20, wherein the current control frequency representation is based on a modeled frequency response of the inverse system transfer function.

22. The control system of claim 20, further comprising a memory storing one or more measured frequency responses of the inverse system transfer function to be used in generating the current control frequency representation.

23. The control system of claim 16, wherein the one or more selected frequency components of the error frequency representation are within an expected frequency range of repetitive positioning errors exhibited by the precision assembly.

24. The control system of claim 16, wherein the frequency selection module is configured to suppress unselected frequency components in the filtered error frequency representation.

25. The control system of claim 24, wherein the frequency selection module is configured to zero the unselected frequency components in the filtered error frequency representation.

26. A precision assembly comprising a stage that retains an object and the control system of claim 16, wherein the control system is configured to control the movement of the stage that retains the object.

27. An exposure apparatus comprising an illumination system that irradiates radiant energy and the precision assembly according to claim 26, the precision assembly carrying the object disposed on a path of the radiant energy.

28. A control system for controlling movement of a precision assembly stage, comprising:
    a stage control system having a controller that generates a force command signal using a stage position error signal to move a stage of a precision assembly; and
    an iterative learning control module, coupled to the stage control system, having a programmable processor and a non-transient computer readable storage medium with instructions for causing the programmable processor to perform a method for controlling movement of the stage, the method comprising
    generating an error frequency representation of the stage position error signal, wherein the stage position error signal is in a time domain and the error frequency representation is solely in a frequency domain,
    selecting one or more frequency components of the error frequency representation that is solely in the frequency domain to generate a filtered error frequency representation that is solely in the frequency domain,
    generating a current control frequency representation solely in the frequency domain based on the filtered error frequency representation,
    generating a current control signal in the time domain from the current control frequency representation, and
    inputting the current control signal to the controller of the stage control system to control movement of the stage.

29. The method of claim 1, wherein the iterative learning control system comprises a programmable processor and a non-transient computer readable storage medium with instructions for execution by the programmable processor, the selecting the one or more frequency components of the error frequency representation in the frequency domain to generate the filtered error frequency representation in the frequency domain being performed by the programmable processor.

* * * * *